3,074,792
PREPARATION OF CONCENTRATED
SUPERPHOSPHATE
Ronald D. Young, Fred G. Heil, Jr., and Alvin B. Phillips, Florence, Ala., assignors to Tennessee Valley Authority, a corporation of the United States
Filed Apr. 23, 1959, Ser. No. 808,540
3 Claims. (Cl. 71—41)
(Granted under Title 35, U.S. Code (1952), sec. 266)

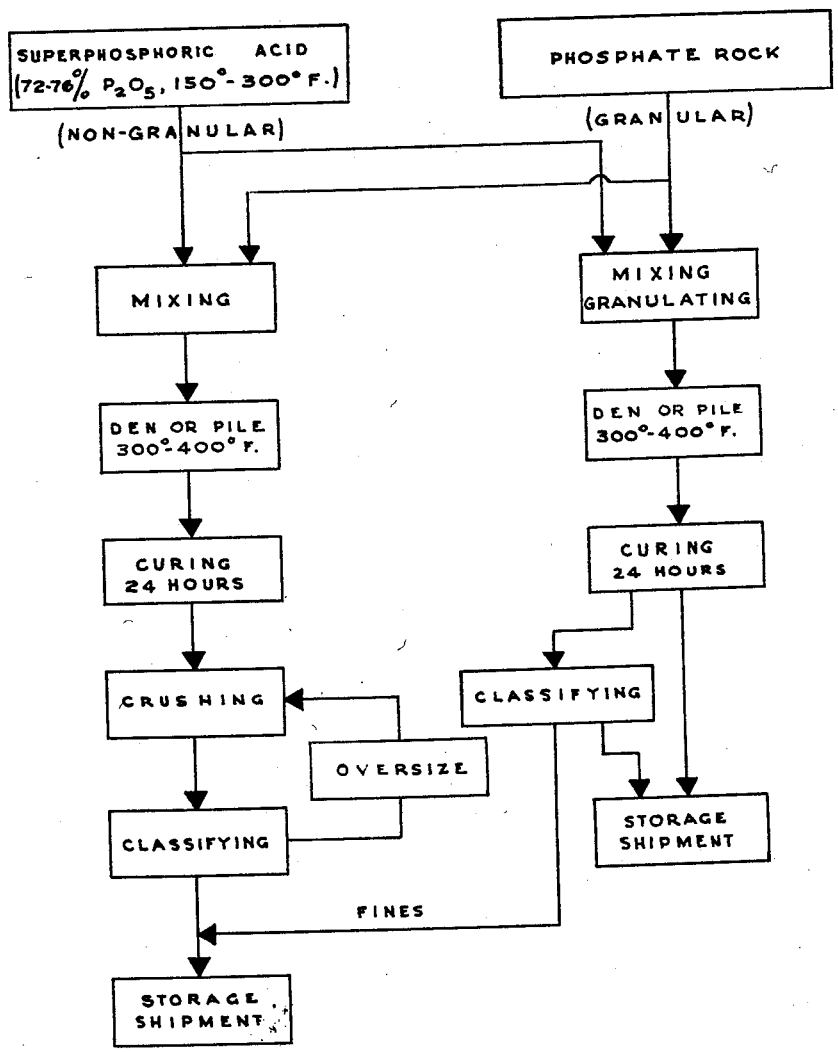

The invention herein described may be manufactured and used by or for the Government for governmental purposes without the payment to us of any royalty therefor.

This invention is an improved process for the manufacture of concentrated superphosphate fertilizers.

It has been customary to prepare triple superphosphate containing approximately 48 percent $P_2O_5$ by reaction of phosphate rock with phosphoric acid. Such triple superphosphate has been limited to an available $P_2O_5$ content of about 48 percent, because it has been known that as the concentration of phosphoric acid used increases the degree of conversion of phosphate in the phosphate rock to an available form decreases markedly. The preparation of such triple superphosphate has been carried out by intimately mixing phosphate rock with phosphoric acid containing from 45 to 85 percent $H_3PO_4$ (33 to 62 percent $P_2O_5$) and maintaining a reaction temperature in the range from 32° F. to a maximum of about 200° F. It has also been known that the degree of conversion of phosphate to available form falls off as the temperature of reaction increases.

Fresh superphosphate withdrawn from a mixing zone after preparation according to the above method has required a curing time of about 2 to 4 weeks for completion of the reaction. During such curing time it is customary to handle the fresh superphosphate so that curing occurs at a temperature in the range from about 80° F. to 190° F. It is a well-known fact that in such conventional processes temperatuares substantially above 190° F. during curing may result in decreased conversion, or even reversion, of the phosphate.

In such conventional processes approximately 10 percent of the fluorine content of phosphate rock used is evolved in gaseous form during the reaction and during curing.

It is an object of this invention to provide a process for the manufacture of superphosphate fertilizer containing from 50 to 60 percent of available $P_2O_5$.

Another object is to provide such process wherein about 40 to 60 percent of the fluorine content of the phosphate rock used is evolved during mixing and early stages of curing.

Another object is to provide such process which results in a very porous product.

Another object is to provide such process in which the total curing time may be reduced to about 24 hours.

Another object is to provide such process which may be used to produce a granular product without use of recycled fines, thus increasing capacity of equipment used.

Yet another object is to provide such process which inherently results in a substantially dustless product of very low water content, thus decreasing dust problems in plants making or using the products.

Other advantages and objects of our invention will become apparent as this disclosure proceeds.

We have found that these objects are attained in a process which comprises intimately mixing finely divided phosphate rock with phosphoric acid containing from about 72 to 76 percent $P_2O_5$ (100 to 105 percent $H_3PO_4$ equivalent); conserving heat in the resulting fresh superphosphate; and curing the fresh superphosphate at resulting elevated temperatures, thereby evolving about 40 to 60 percent of all fluorine contained in the phosphate rock used.

We prefer to use a superphosphoric acid containing approximately 74 percent $P_2O_5$ and, if the acid to be used contains more than this quantity of $P_2O_5$, to dilute the acid to about 74 percent prior to use.

We have found that phosphoric acid containing about 74 percent $P_2O_5$ results in a more pronounced increase in temperature than acid of other concentration, gives better conditions for conversion of phosphate, and facilitates evolution of fluorine.

We prefer to heat the acid used to a temperature in the range from about 150° to 300° F., and preferably from about 180° to 250° F., prior to mixing it with phosphate rock, primarily to ensure that autogenous temperatures in the resulting fresh superphosphate will go high enough for substantially complete conversion of phosphate and for rapid evolution of fluorine. Since acid of this strength is very viscous at room temperature, advantages in pumping and metering acid and in ease of mixing with phosphate rock also are attained by preheating the acid.

Fine phosphate rock should be used. We have found that excellent results are attained when the rock is sufficiently fine that about 75 percent will pass a standard 200-mesh Tyler screen.

When preparing nongranular fertilizer, we prefer to mix the acid and rock in a cone-type mixer similar to that shown and described in U.S. Patent 2,528,514. During mixing, heat of reaction causes the temperature of the acid-rock mixture to rise, and fresh warm superphosphate is withdrawn from the mixer into a den or similar device where the heat of reaction may be conserved. Contrary to standard practice, we have found that curing of the fresh superphosphate made from such concentrated phosphoric acid should be carried out for at least a part of the time at a resulting elevated temperature in the range from about 270° to 400° F. We have found that when acid of such high strength is blended with the rock, the percentage of available $P_2O_5$ is increased by curing at such elevated temperature.

We prefer to cure for at least 1 hour at a temperature in the range from about 300° to 400° F. and to allow cooling at a slowly decreasing temperature due to radiation of heat from the curing superphosphate. When acid of such strength is used and the curing is carried out at a naturally occurring elevated temperature, we have found that the curing is substantially complete in about 24 hours and that about 40 to 60 percent, and usually about 50 to 60 percent, of the total fluorine content of the original phosphate rock is evolved in vapor state during mixing and curing; the greater part is evolved during early stages of the curing period.

The resulting product has an available $P_2O_5$ content in the range from about 50 to 60 percent, usually about 54 to 55 percent, and is very porous—much more so than conventional triple superphosphate prepared in a similar manner from weaker phosphoric acid and phosphate rock. This high porosity is quite advantageous when the superphosphate is to be ammoniated in a later step.

The greater part of the evolution of fluorine occurs during early stages of this curing period, and offgases from curing of the superphosphate contain sufficient amounts of gaseous fluorine and fluorides to make their recovery as cryolite very easy by proceeding according to methods described by Tarbutton et al. in co-pending applications Serial Nos. 767,071, 767,072, and 767,073, now U.S. Letters Patent Nos. 2,981,597, 2,981,598, and 2,963,344, respectively.

About 92 to 96 percent of the phosphate in the product is in water-soluble form as contrasted to about 89 to 90 percent water-soluble phosphate in conventional triple superphosphate.

We have found that the degree of conversion increases as the temperature of acid fed increases from about 150° to 300° F. The product has less tendency to cake during curing than does conventional triple superphosphate and is much less dusty, thus reducing dust problems always present in plants making or using superphosphate.

The attached drawing is a flowsheet illustrating two processes conducted according to principles of our invention. Either granular or nongranular fertilizer may be made, as desired. The column at the left side of the drawing illustrates preparation of nongranular fertilizer, while the column on the right side illustrates preparation of a granular superphosphate.

With reference to the drawing, a phosphoric acid having a concentration of 72 to 76 percent $P_2O_5$, or preferably about 74 percent $P_2O_5$, is fed to the mixing step shown at the top of the left column at a temperature in the range from about 150° to 300° F. Phosphate rock at normal outdoor temperature also is fed to the mixing step. Ordinarily the proportions of phosphate rock and phosphoric acid will be chosen to give a $P_2O_5$:CaO mole ratio in the range from about 0.95 to 1.0, but proportions outside this range can be used if necessary.

The phosphate rock, which is preferably of such fineness that about 75 percent will pass a standard 200-mesh Tyler screen, is intimately mixed with the phosphoric acid fed. Heat is evolved during mixing. Warm fresh superphosphate is withdrawn and is placed in a suitable den or pile of such proportions as to conserve heat of reaction by decreasing area for radiation of heat from the mass of fresh superphosphate. A secondary reaction occurs within the den or pile, and the temperature will rise to the range of about 300° to 400° F. The den or pile should be so arranged that the temperature will remain in this range above 300° F. for at least 1 hour. The temperature then falls slowly by radiation of heat, and curing is contained under such conditions until it is substantially complete after a period of about 24 hours. During curing the superphosphate sets to a cake, but this cake is quite friable and is not nearly so difficult to break up as a cake resulting from the manufacture of the usual triple superphosphate. The cake is then crushed, the product is classified, oversize is returned to the crusher, and the fertilizer is ready for bagging, storage, or shipment.

The column on the right side of the drawing shows diagrammatically the step required for preparing granular superphosphate according to our process. Phosphoric acid having the same concentration and temperature used for the preparation of nongranular fertilizer and phosphate rock are fed to any suitable device that both mixes and granulates the fresh superphosphate. Such device may include a rotary drum or a device similar to that shown in U.S. Patent 2,741,545.

Granulation of the fresh superphosphate produced is so easy that substantially all the product is readily converted to granules of size acceptable to the trade as granular fertilizer. It is not necessary to use any recycled fine material to control the granulation, and the capacity of any particular equipment for producing granules is increased correspondingly. The degree of granulation is controlled principally by controlling the temperature of acid used, within the ranges given above.

Frequently, it may be desirable to produce both granular and nongranular material for the market. When desired, both granular and nongranular fertilizers may be made in a single piece of equipment merely by adjusting the temperature of the acid fed, distribution, and feed rates so that granulation is incomplete.

Fines may be separated from granular material at any time after 1 hour of curing at a temperature from about 300° to 400° F., and then placed in a pile of such dimensions as to conserve heat during the remainder of the curing period required. We prefer, however, to leave the fines in the granular material until curing is complete. Under these conditions there is so little caking that the fines are easily separated from the granules merely by shaking on a screen.

Fresh warm granulated superphosphate which may contain fines is withdrawn from the mixing-granulating step into a suitable den or pile whose proportions are arranged to prevent excessive loss of heat by radiation. The temperature in such den or pile of granulated superphosphate rises to the range of about 300° to 400° F. This heat is conserved by the dimensions of the den or pile to maintain a temperature in the range from about 300° to 400° F. for at least a short time, and preferably for at least 1 hour. This period is followed by a curing period in which the material gradually cools by radiation of heat. Again, curing is substantially complete within a period of about 24 hours. Granules of this material have little tendency to cake or stick together, and after a curing period may be passed directly to classifying equipment and there classified. A product-size cut is withdrawn to storage, use, or shipment.

Both granular and nongranular superphosphates produced by this process are substantially dustless, although very low in moisture content. Dust problems, always present in plants making or using superphosphate, are greatly reduced when our process or its products are employed.

The following examples illustrate specific applications of our process.

Example I

A large-scale test was made in which the new superphosphate was produced at the rate of 10 tons per hour. Superphosphoric acid containing 75.7 percent $P_2O_5$ was diluted with water to a concentration of 73.9 percent $P_2O_5$. The acid was heated to 175° F. and fed to a mixer along with phosphate rock in proportions such that the $P_2O_5$ (rock $P_2O_5$+acid $P_2O_5$):CaO mole ratio was 1.01. The phosphate rock was ground so that about 75 percent was minus 200 mesh (Tyler). It contained 32.8 percent $P_2O_5$ and 47.4 percent CaO. The temperature of the rock was 42° F. The temperature of the mixture as it discharged from the mixer was 160° F. The setting time was 80 seconds. During the first 24 hours of storage in a pile, the temperature of the superphosphate was between 270° and 300° F. Analysis showed that 40 percent of the fluorine present in the phosphate rock was evolved. Chemical analysis of the product after curing is shown below.

| Chemical analysis, percent | | | | | | |
| --- | --- | --- | --- | --- | --- | --- |
| $P_2O_5$ | | | | CaO | F | $H_2O$ |
| Total | Available | Water soluble | Free acid | | | |
| 56.9 | 56.3 | 54.6 | 2.7 | 22.1 | 0.7 | 0.8 |

Example II

Another test was made in the same manner as described in Example I. In this test the $P_2O_5$:CaO mole ratio was 0.95. The phosphate rock contained 32.2 percent $P_2O_5$ and 46.6 percent CaO. The temperature of the acid, after dilution to 73.9 percent $P_2O_5$, was 215° F., and the temperature of the phosphate rock was 29° F. The temperature of the mixture as it discharged from the mixer was between 190° and 200° F. The setting time was 60 seconds, which was lower than in Example I because of the higher temperature of the mixture. After 24 hours' storage in a pile, the temperature of the superphosphate was between 270° and 300° F.

Chemical analysis of the product after curing is shown below.

| Chemical analysis, percent | | | | | | |
|---|---|---|---|---|---|---|
| $P_2O_5$ | | | | CaO | F | $H_2O$ |
| Total | Available | Water soluble | Free acid | | | |
| 55.9 | 54.9 | 53.1 | 2.8 | 22.8 | 0.7 | 0.8 |

*Example III*

Superphosphoric acid, equivalent in concentration to 102 percent $H_3PO_4$, was heated to 225° F. and mixed for 1 minute with Florida phosphate (32 percent $P_2O_5$, 46 percent CaO, 3.6 percent F., 75 percent −200 mesh) in a small mixer. The acidulation mole ratio, $P_2O_5$:CaO, was 0.98. After mixing, the acidulate was transferred to a Dewar flask and retained for 65 minutes. The temperature of the acidulate rose to about 255° F. 10 minutes after mixing and remained at this temperature for an additional 10 minutes. After about 20 minutes, the temperature started to rise again and reached a maximum of 327° F. in a total time of about 50 minutes. The superphosphate was removed from the Dewar flask after 65 minutes, allowed to cool, and analyzed within 24 hours. The analysis of the superphosphate showed the following composition.

| Chemical analysis, percent | | | | | | |
|---|---|---|---|---|---|---|
| $P_2O_5$ | | | | CaO | F | $H_2O$ |
| Total | Citrate insoluble | Water soluble | Free acid | | | |
| 56.0 | 1.0 | 53.6 | 3.7 | 22.0 | 0.9 | 0.9 |

If it is assumed that no fluorine was evolved after removing the superphosphate from the Dewar flask, the amount of fluorine evolved in 65 minutes was approximately 50 percent of that originally present in the phosphate. About 93 percent of the $P_2O_5$ in the phosphate was converted to an available form. The concentration of available $P_2O_5$ in the superphosphate was 55 percent.

*Example IV*

A test was made in a pilot plant consisting of a funnel-type mixer and a continuous den. Florida phosphate (32 percent $P_2O_5$, 46 percent CaO, 3.6 percent F., 75 percent −200 mesh) was fed to the mixer at the rate of 400 pounds per hour. Superphosphoric acid was heated in a tank and fed to the mixer after being diluted continuously in a mixing T with water to the equivalent of 102 percent $H_3PO_4$ (about 74 percent $P_2O_5$). The temperature of the diluted acid as it entered the mixer was 225° F. The ratio of acid to phosphate was such that the $P_2O_5$:CaO mole ratio was 0.98. The acidulate was retained in the den for 1 hour. A sample of the superphosphate as it left the den was placed in a container with a loose-fitting cover and retained for 24 hours at the temperature of 280° F. This treatment was intended to simulate storage in a large pile. It is believed that the average temperature of a pile in a commercial plant during the 24-hour period after denning would normally exceed 280° F. The chemical analyses of the superphosphate after denning and after 24 hours of curing are given below.

| | Chemical analysis, percent | | | | | |
|---|---|---|---|---|---|---|
| | $P_2O_5$ | | | | F | $H_2O$ |
| | Total | Available | Water soluble | Free acid | | |
| Denned sample (330° F.) | 56.0 | 54.5 | 51.7 | 3.2 | 0.8 | 1.4 |
| Cured sample (280° F.) | 56.6 | 54.9 | 52.5 | 3.0 | 0.7 | 1.1 |

Calculations showed that 91 percent of the $P_2O_5$ from the phosphate rock had been converted to an available form during denning and that 55 percent of the fluorine in the phosphate was evolved. No increase in conversion resulted from curing for 24 hours, but the total fluorine evolved increased to 61 percent and the concentration of available $P_2O_5$ in the superphosphate increased from 54.5 to 54.9 percent.

The products obtained in the above tests, Examples I through IV, were much more porous than triple superphosphate prepared by conventional methods, were very low in moisture content, required no drying, were non-caking, and were substantially dustless.

*Example V*

The process illustrated in the column on the right side of the drawing was carried out for the production of a semigranular fertilizer. Fine phosphate rock containing 32.3 percent $P_2O_5$, 46.4 percent CaO, and 0.5 percent water, and phosphoric acid containing 73.9 percent $P_2O_5$ were fed into a rotary drum. The phosphoric acid was preheated to 276° F. before feeding. About 30 to 60 pounds of steam per ton of reactant also was introduced into the drum. The average temperature during reaction rose to about 326° F. Acid and rock were so proportioned that the $P_2O_5$:CaO mole ratio in the materials was about 1.05:1. Distributors for acid and feed were located beneath the bed of materials in the drum. No recycle was used. The degree of granulation was controlled primarily by the temperature at which the acid was preheated, although the steam rate also was varied as a secondary control of granulation.

The product desired was a semigranular mixture containing about 50 percent of material having a size from −6 to +16 mesh, and the bulk of the remainder was −16 mesh in size. The rate of production in this pilot plant was 1.7 tons per hour. Over-all operation and control of granulation were good.

It was necessary to preheat the acid to about 275° F. for best control, although temperatures from 225° to 250° F. are quite satisfactory when the ratio of $P_2O_5$:CaO in the product is in the range from 0.98:1 to 1:1. It was necessary to use an average of about 35 pounds of steam per ton of product to maintain temperature of about 225° to 230° F. in the drum.

The semigranular material emerging from the drum contained 51 percent of granules in the desired −6, +16 mesh size range. This material was placed in a stationary den and held there for 20 hours at an initial temperature of about 326° F., which increased and then gradually decreased to about 250° F. After expiration of 20 hours, 89 percent of the $P_2O_5$ from phosphate rock had been converted to available form and 52 percent of the total fluorine content of the rock had been evolved. Samples of the material were taken and cured for an additional 4 days at 250° F. and further cured for 10 days at 150° F. After 4 days, 94 percent of the $P_2O_5$ from phosphate rock was in available form and 69 percent of the total original fluorine content of the rock had been evolved.

No further conversion was attained and no further fluorine was evolved on holding the material for an additional 10 days. The time when 94 percent conversion was obtained was not established, nor was the time when the evolution of fluorine reached 69 percent; but it obviously was less than 4 days. The material was dry, non-caking, and substantially dustless.

Chemical analysis of the product after curing 4 days at 250° F. was:

| Chemical analysis, percent | | | | | |
|---|---|---|---|---|---|
| $P_2O_5$ | | | | F | $H_2O$ |
| Total | Available | Water soluble | Free acid | | |
| 55.8 | 54.9 | 52.1 | 3.8 | 0.5 | 2.0 |

We claim as our invention:

1. A process for the manufacture of superphosphate fertilizer containing from about 50 to 60 percent available $P_2O_5$ and low in fluorine which comprises introducing finely divided phosphate rock into a mixing zone; therein intimately mixing the rock with phosphoric acid containing from about 72 to 76 percent $P_2O_5$ introduced at a temperature in the range from about 150° to 300° F.; withdrawing fresh superphosphate from the mixing zone; conserving the autogenous heat of reaction in the fresh superphosphate; curing the fresh superphosphate for about one hour at a temperature in the range from about 270° to 400° F.; supplying substantially all of the heat for maintaining said temperature range from the heat of reaction of the reactants; subsequently cooling and continuing curing the resulting partially cured superphosphate until more than 90 percent of the phosphate rock is converted to an available form; and evolving fluorine present in the phosphate rock during the mixing and curing steps in quantities sufficient to yield a superphosphate product containing less than about 0.7 percent fluorine.

2. The process of claim 1 wherein the phosphoric acid introduced contains about 74 percent $P_2O_5$.

3. The process of claim 1 wherein the fresh superphosphate is cured for at least 1 hour at a temperature in the range from 300° to 400° F. and curing is completed within 24 hours.

References Cited in the file of this patent

UNITED STATES PATENTS

| | | |
|---|---|---|
| 2,070,582 | Curtis | Feb. 16, 1937 |
| 2,072,980 | Curtis | Mar. 9, 1937 |
| 2,361,444 | Zbornik | Oct. 31, 1944 |
| 2,522,500 | Bridger | Sept. 19, 1950 |
| 2,528,514 | Harvey et al. | Nov. 7, 1950 |
| 2,914,380 | Vickery | Nov. 24, 1959 |